United States Patent
Baumann et al.

(10) Patent No.: US 6,536,494 B1
(45) Date of Patent: Mar. 25, 2003

(54) PNEUMATIC VEHICLE TIRE

(75) Inventors: Karlheinz Baumann, Gelnhausen (DE); Robert Nau, Hammersbach (DE); Günter Dietrich, Frankfurt (DE)

(73) Assignee: Dunlop GmbH, Hanau (DE)

( * ) Notice: Subject to any disclaimer, the term of this patent is extended or adjusted under 35 U.S.C. 154(b) by 0 days.

(21) Appl. No.: 09/469,319

(22) Filed: Dec. 22, 1999

(30) Foreign Application Priority Data

Dec. 24, 1998 (DE) .......................................... 198 60 362

(51) Int. Cl.⁷ .......................... B60C 17/00; B60C 15/00
(52) U.S. Cl. ...................... 152/517; 152/516; 152/552; 152/554; 152/550
(58) Field of Search ................................. 152/517, 532, 152/550, 527, 552, 554

(56) References Cited

U.S. PATENT DOCUMENTS

| | | | | |
|---|---|---|---|---|
| 4,699,832 A | * | 10/1987 | Sattelmeyer | 428/36 |
| 5,164,028 A | * | 11/1992 | Uemura | 152/527 |
| 5,295,526 A | * | 3/1994 | Tokieda | 152/517 |
| 5,368,082 A | | 11/1994 | Oare et al. | |
| 5,511,599 A | * | 4/1996 | Willard, Jr. | 152/454 |
| 5,526,862 A | * | 6/1996 | Ghilardi | 152/517 |
| 5,685,927 A | * | 11/1997 | Hammond | 152/209 |
| 5,769,980 A | * | 6/1998 | Spragg | 152/517 |
| 5,988,247 A | * | 11/1999 | Tanaka | 152/517 |
| 6,131,633 A | * | 10/2000 | Slivka | 152/532 |
| 6,196,289 B1 | * | 3/2001 | Yoshioka | 152/517 |

FOREIGN PATENT DOCUMENTS

| | | | |
|---|---|---|---|
| JP | 07069004 A | * | 8/1993 |
| JP | 11-291725 | | * 10/1999 |

* cited by examiner

Primary Examiner—Michael W. Ball
Assistant Examiner—Justin Fischer
(74) Attorney, Agent, or Firm—Birch, Stewart, Kolasch & Birch, LLP

(57) ABSTRACT

Pneumatic vehicle tires comprising a carcass which extends between two bead rings, a belt arrangement provided between the carcass and a tread strip, and also rubber reinforcing plies arranged in the sidewall regions, which adopt a supporting function when the tire is deflated, are characterized in that a single rubber reinforcing ply is arranged radially within a first carcass ply and its maximum thickness is disposed in the upper half of the sidewall height; with the rubber reinforcing ply extending from the bead apex region up to and beneath the edge region of the belt ply, and with the bead apex, which extends approximately up to the half sidewall height, being surrounded by the first carcass ply.

9 Claims, 2 Drawing Sheets

PNEUMATIC VEHICLE TIRE

BACKGROUND OF THE INVENTION

1. Field of the Invention

The invention relates to a pneumatic vehicle tire comprising a one- or two-ply carcass, which extends between two bead rings having associated bead apexes, a belt arrangement provided between the carcass and a tread strip, and also rubber reinforcing plies arranged in the sidewall regions, which adopt a supporting function when the tire is deflated.

2. Prior Art

Pneumatic vehicle tires of this kind are, for example, known from U.S. Pat. No. 5,368,082. It is possible, by means of such tires, in the event of a puncture, to allow travel with a deflated tire over larger distances at adequate speed before a repair of the tire or a change of the tire has to be effected. Such tires accordingly increase safety in the event of a puncture and make it possible to reach the next repair workshop without problem, so that undesired tire changing can be avoided which is also dangerous on roads with heavy traffic.

SUMMARY OF THE INVENTION

The object of the present invention is to so design a pneumatic vehicle tire of the initially named kind that a high mileage is possible at an adequately high speed, even in the deflated state, with the stiffening rubber plies provided in the sidewalls not disturbingly impairing the riding comfort of the tire when operated at normal pressure and with the weight of the tire remaining as small as possible.

This object is satisfied in accordance with the invention essentially in that a rubber reinforcing ply is arranged in the sidewall regions radially within a first carcass ply and its maximum thickness is disposed in the upper half of the sidewall height; in that the rubber reinforcing ply extends, starting from the bead apex region, up to and beneath the edge region of the belt ply, and in that the bead apex, which extends approximately up to the half sidewall height, is surrounded by the first carcass ply, which is led around the respective bead core.

The rubber reinforcing ply and the bead apex preferably consist of the same rubber mixture.

DESCRIPTION OF THE INVENTION

As a result of the choice of the rubber mixture, of the thickness of the rubber reinforcing ply and of the cure times of this rubber reinforcing ply, which respectively differ in dependence on the position of the rubber reinforcing ply in the tire, ideal values are obtained with regard to the long running characteristics when the tire is deflated, in particular when, as a result of the mixtures that are used and of the selective hardening time in the finished tire, the modulus of elasticity $E^*$ of the rubber reinforcing plies and also of the bead apex is the same as or greater than 9 Mpa and the tan $\delta$ value is the same as or smaller than 0.03 (measured by means of "EPLEXOR", 10 Hz, 10% prestress and 1% DSA). The hardness IRHD of this rubber reinforcing ply and also of the bead apex is preferably the same as or greater than 80 when measured at room temperature. The measurement of the IRHD (International Rubber Hardness Degree) takes place analogously to the Shore hardness measurement, but with a ball-shaped measuring tip. The measurement or testing takes place in this connection in accordance with DIN 53519, with the so-called microhardness being determined, since small samples are measured which are taken from the respective tire.

The rubber reinforcing ply and the bead apex are preferably manufactured from a rubber mixture which is a polymer mixture of natural rubber (NR)/isoprene rubber (IR) and butadiene rubber (BR), with at least 50 parts NR/IR being contained in this polymer mixture, a carbon black content of 50 to 60 parts, preferably of a rapidly injectable FEF carbon black, and also 5 to 8 parts zinc oxide, 2 parts stearic acid, 1.5 parts aging protection agent, and also one or more parts vulcanization accelerator and sulfur (preferably 4 to 5 parts), in order to keep the loss characteristics of the mixture low.

In the event of using an additional second carcass ply, the basic construction of the tire with a single layer carcass is retained largely unchanged. The second carcass ply being provided radially outside the first carcass ply and extending up to and into the upper third of the height of the sidewall while lying against the first carcass ply and preferably terminating in the bead side bead apex region, while lying against the end region of the first carcass ply turned around the bead core. In this arrangement the turned over end of the first carcass ply is in particular led upwardly into the top third of the sidewall height between the two carcass plies and is directly connected to them. In this way the advantage is achieved, in comparison to tires with two ply carcasses and a reinforcing ply also provided in the sidewall region between the two carcass plies, that both carcass plies are only exposed to a small compression in the upper third of the sidewall region, which is in particular of special significance when carcass plies of Kevlar are used, which should—as far as possible—not be exposed to any form of compression.

In the regions of the sidewall in which the two carcass plies extend lying against one another, it is advantageous to introduce an elastic buffer layer between the two carcass plies in order to achieve a certain relative mobility between the two plies and a defined stiffness as a result of the spacing that is set.

Further advantageous embodiments of the invention are set forth in the subordinate claims.

The invention will subsequently be explained in more detail with reference to embodiments and to the drawing, in which are shown:

DETAILED DESCRIPTION OF THE INVENTION

Figure 1:
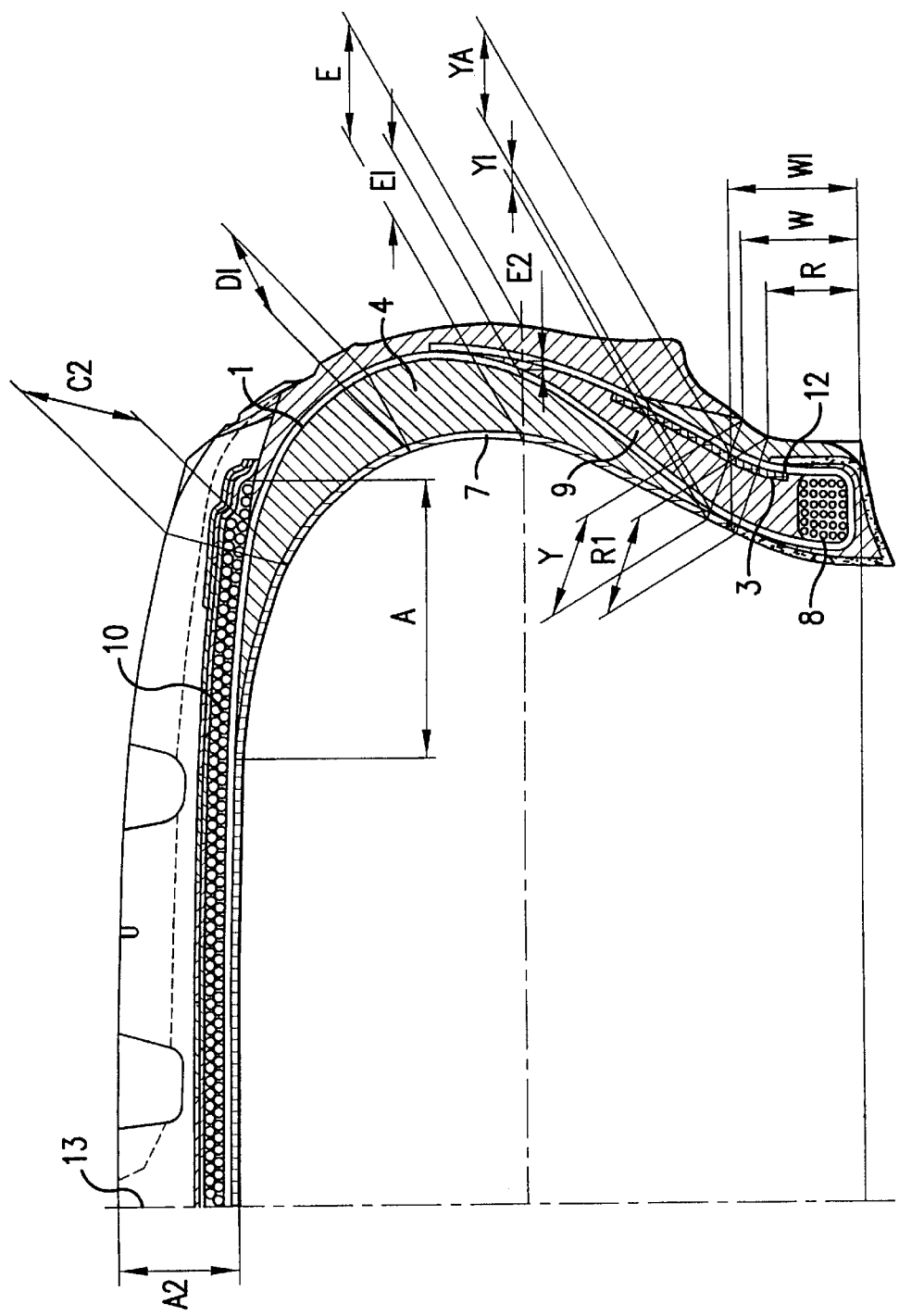
FIG. 1 a schematic axially sectioned representation of one half of a centrally symmetrically formed tire in accordance with the invention having one carcass ply.

In accordance with FIG. 1 the tire, of which the part of the right of the central plane 13 of the tire is shown, has a carcass ply 1, which passes around the bead 8 and the turned around end 12 of which is led upwardly over at least half the height of the tire and contacts against and is connected to the outer side of the carcass ply 1 following the bead apex region 9. The bead apex 9 is accordingly fully enclosed by the carcass ply 1.

A reinforcing or stiffening strip 3 is provided between bead apex 9 and the turned around end 12 of the carcass ply 1 and can consist of a textile material which extends up to and into the direct vicinity of the bead ring 8. A rubber reinforcing ply 4 is provided radially within the carcass ply 1, which extends, while converging to a pointed apex, up to and beneath the belt ply 10 at one end and terminates at the other end approximately at the level of the maximum bead width. The region of maximum thickness of the rubber reinforcing ply 4 is disposed in the upper third of the sidewall height, and this leads to the carcass ply 1 being displaced radially outwardly to such an extent that it is not exposed to any disturbing compressions in operation.

The rubber reinforcing ply 1 adjoins an inner rubberizing layer 7 at the radially inner side.

Of important significance for the mileage of the tire in the deflated state, and also for the behavior in normal running, is, on the one hand, the design of the rubber reinforcing ply with respect to its radial height and its thickness profile over the height and, on the other hand, the mixture used for the rubber reinforcing ply. The rubber reinforcing ply comprises a rubber mixture of mixture of NR and/or IR and BR as well as carbon black, white zinc oxide, stearic acid, aging protection agent, softener, sulfur and accelerator. Reinforcing ply and bead apex are preferably manufactured from a rubber mixture comprising a polymer mixture of NR/IR and BR and at least 50 parts NR/IR, a carbon black content of 50 to 60 parts, 5 to 8 parts zinc oxide, 2 parts stearic acid, 1.5 parts aging protection agent and also at least one part vulcanization accelerator and sulfur. Preferably 4 to 5 parts of sulfur are used in order to keep the loss characteristics of the mixture low.

The rubber mixture intended for the rubber reinforcing ply 4 and the bead apex 9 or the bead apex region must be hardened in such a way that the rubber reinforcing ply has the following characteristics in the finished tire:

- hardness IRDH greater than or equal to 80, measured at room temperature,
- modulus of elasticity (MPa) greater than or equal to 9 MPa and tan $\delta$ smaller than or equal to 0.03, measured in each case at 70° C. and by means of "EPLEXOR", 10 Hz, 10% prestress, 1% DSA (Double Strain Amplitude).

The IRDH measurement (International Rubber Hardness Degree) takes place in accordance with the test method DIN 53519 sheet 2.

EXAMPLE 1

In the drawing which shows a preferred embodiment of the invention, measurement positions are inserted with positional accuracy, with reference to which the thickness values and positions important for the invention can be recited.

The tire thickness A2 at the center of the crown preferably amounts to 17.0±0.8 mm, whereas the tire thickness C2 at the shoulder amounts to 18.0±1.0 mm at the position quoted. The thickness Y of the bead amounts at the position shown to 18.5±1.5 mm, whereas the bead thickness R1 at the point shown at the level of the dimension R amounts to 15.0±1.5 mm.

The measurement of the bead thickness Y takes place at the level of the dimension W entered into the drawing, with the measuring plane extending as shown in the drawing.

The rubber reinforcing plies 4 have, over their radial height, a characteristic thickness profile which is evident from the drawing and which is dimensionally accurately defined by the thickness values present in the drawing at the measurement positions quoted.

At the measurement position D1, which is disposed approximately at the height of two thirds of the sidewall height, the rubber reinforcing ply 4 has a thickness of 12.0±1.0 mm.

At the measurement position E1, at the half sidewall height, the thickness of the rubber reinforcing ply is 12.0±0.5 mm at the same height.

At the measurement position Y1 the layer thickness amounts to 4.5±0.5 mm and at the measurement position YA the bead apex thickness amounts to 12.0±1.0 mm. Between the values quoted with respect to the defined measurement positions, the thickness of the rubber reinforcing plies 4 (at both sides of the tire), change continuously.

At the measurement position Y the bead has a thickness of 18.5±1.7 mm in the plane shown, with the thickness profiles with respect to the rubber reinforcing ply 4 and the bead apex region 9 continuously changing between the values quoted with respect to the defined measurement positions.

The value R1 (bead) shown in the drawing amounts to 15.0±1.5 mm, while the bead height W1 amounts to 22.0±5.0 mm.

With regard to the overlap of the rubber reinforcing ply 4 in the radially outer region by the belt plies 10 the value A is 33.0±2.5 mm, i.e. a pronounced overlap is present, with the edge regions of the belt contacting a comparatively thick rubber layer, which ensures that in operation the carcass ply 1 is protected from compression effects.

EXAMPLE 2

Figure 2:
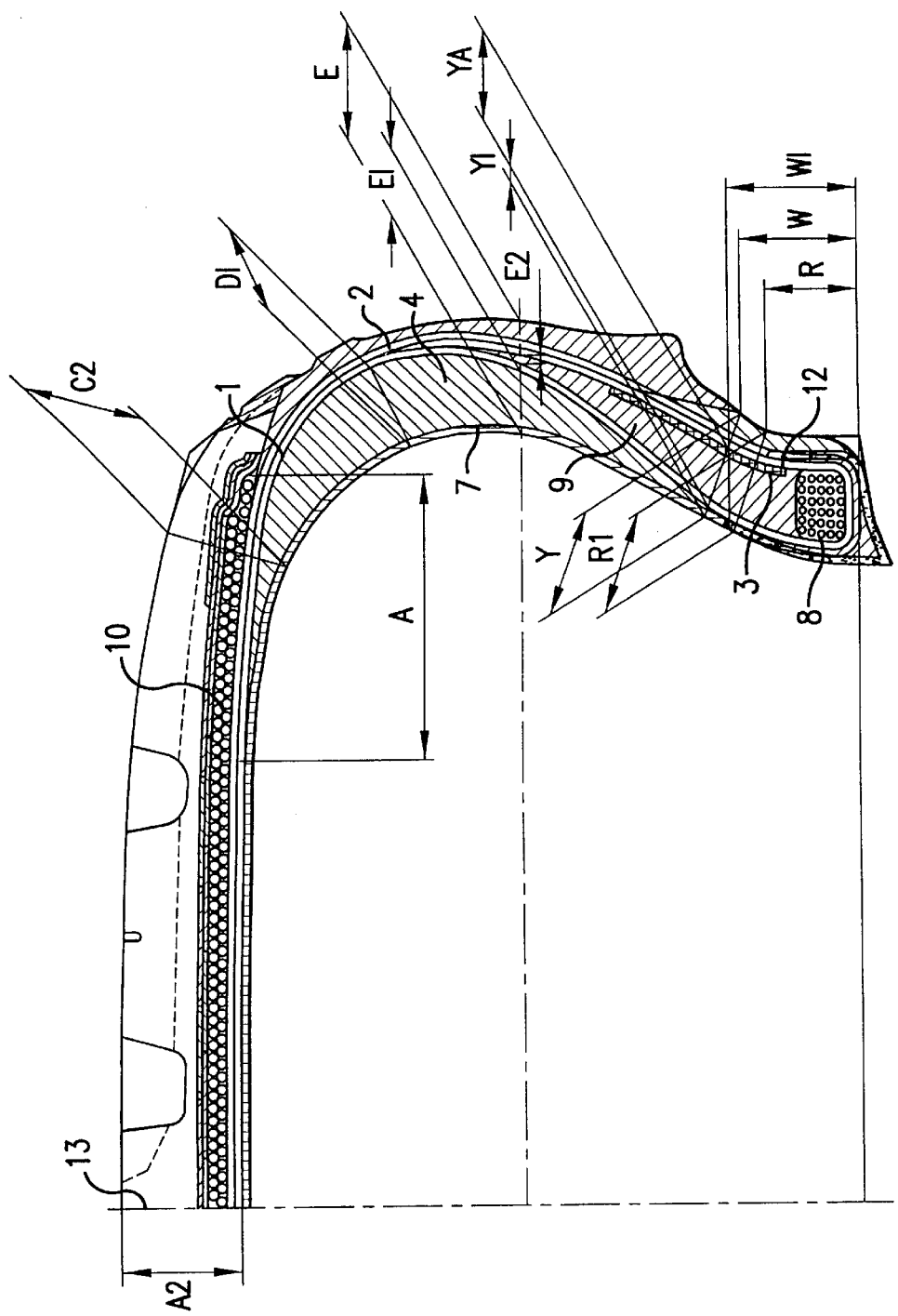
FIG. 2 a schematic axially sectioned representation of one half, of a centrally symmetrically formed tire in accordance with the invention with two carcass plies.

The embodiment shown in FIG. 2 corresponds, from the point of view of the basic design, the material choice and the dimensions to the embodiments of FIG. 1. However, a second carcass ply 2 is provided in addition to the carcass ply 1, is disposed radially outside the first carcass ply 1 and extends up to and into the region of the upper third of the height of the sidewall while lying against the first carcass ply 1. The two carcass plies 1,2 separate approximately in the region of the measurement position DI shown in FIG. 2, with the inner carcass ply being turned around the bead 8 analogously to the embodiment of FIG. 1, and the turned around end 12 being led upwardly into the upper third of the height of the tire sidewall where it terminates between the two carcass plies 1,2 and is connected to these carcass plies. The outer carcass ply 2 is led, lying against the turned around end 12 of the inner carcass ply, up to and into the vicinity of the bead 8. Through the selected course of the carcass plies it is ensured, in the case of a tire construction with a two ply carcass, that the carcass plies 1,2 are exposed in operation to practically no compressions and thus undesired loadings.

What is claimed is:

1. A pneumatic vehicle tire comprising (i) a two-layer carcass having opposing sidewall regions which extends between two bead cores having associated bead apexes, (ii) a belt provided between the carcass and a tread strip, and (iii) at least one rubber reinforcing layer arranged in each sidewall region of the carcass which adopt a supporting function when the tire is deflated, wherein (a) said at least one rubber reinforcing layer is arranged in each sidewall region radially within a first carcass layer, whose maximum thickness is disposed in the upper half of the sidewall height; said rubber reinforcing layer extending, from the bead apex region of the tire up to and beneath the edge region of the belt;

(b) the bead apex, which extends approximately up to the half sidewall height, is surrounded by the first carcass layer, which is led around the respective bead core;

(c) wherein the modulus of elasticity (E*) of the at least one rubber reinforcing layer and also of the bead apex or of the bead apex region when measured at 70° C. is the same as or greater than 9 Mpa and the tan δ is the same as or smaller than 0.03;

(d) wherein the International Hardness Rubber Degree (IHRD) of the at least one rubber reinforcing layer and also of the bead apex or of the bead apex region is the same as or greater than 80 when measured at room temperature;

(e) wherein a second carcass layer is provided radially outside the first carcass layer and extends up to and into the upper third of the height of the sidewall while lying against the first carcass layer and terminates in the bead side apex region while lying against the end of the first carcass layer turned around the bead core; and (f) wherein the turned-around end of the first carcass layer is led upwardly into the upper third of the sidewall height between the two carcass layers and is connected to them.

2. A pneumatic vehicle tire in accordance with claim 1, wherein a stiffening and reinforcing strip is provided between the turned-around end of the first carcass layer and the bead apex.

3. A pneumatic vehicle tire in accordance with claim 1, wherein said two layer carcass layer comprises rayon.

4. A pneumatic vehicle tire in accordance with claim 1, wherein the belt comprises Kevlar or steel.

5. A pneumatic vehicle tire in accordance with claim 1, wherein the at least one rubber reinforcing layer and also the bead apex region comprise the same rubber mixture.

6. A pneumatic vehicle tire in accordance with claim 1, wherein the at least one rubber reinforcing layer comprises a rubber mixture, which is a polymer mixture of neoprene rubber/isoprene rubber (NR/IR) and butadiene rubber (BR) with at least 50 parts NR/IR, a carbon black content of 50 to 60 parts, 5 to 8 parts zinc oxide, 2 parts stearic acid, 1.5 parts aging protection agent and also at least 1 part vulcanization accelerator and sulfur, with the sulfur component including 4 to 5 parts, and wherein the carbon black comprises FEF-carbon black, which is capable of being sprayed, all of said parts being by weight.

7. A pneumatic vehicle tire in accordance with claim 1, wherein when measured at approximately two thirds of the sidewall height, and at the half sidewall height, the thickness of the at least one rubber reinforcing layer amounts to 12 mm with a tolerance of ±1.0 mm.

8. A pneumatic vehicle tire in accordance with claim 1, wherein when measured in the region of the maximum bead thickness (sidewall height W, measuring plane Y), the total thickness of the tire construction beneath the end of the at least one rubber reinforcing layer amounts to 18.5 mm with a tolerance of ±1.5 mm.

9. A pneumatic vehicle tire in accordance with claim 1, wherein the crown thickness amounts to 17.0±0.8 mm when measured at the tire center and the tire thickness amounts to 18.0±1.0 mm when measured in the transition region of the shoulder and in the region of the end of the at least one rubber reinforcing layer.

* * * * *